May 25, 1954  K. H. PERKINS  2,679,587
PROPORTIONAL VOLTAGE PRODUCING CIRCUIT
Filed Jan. 4, 1951
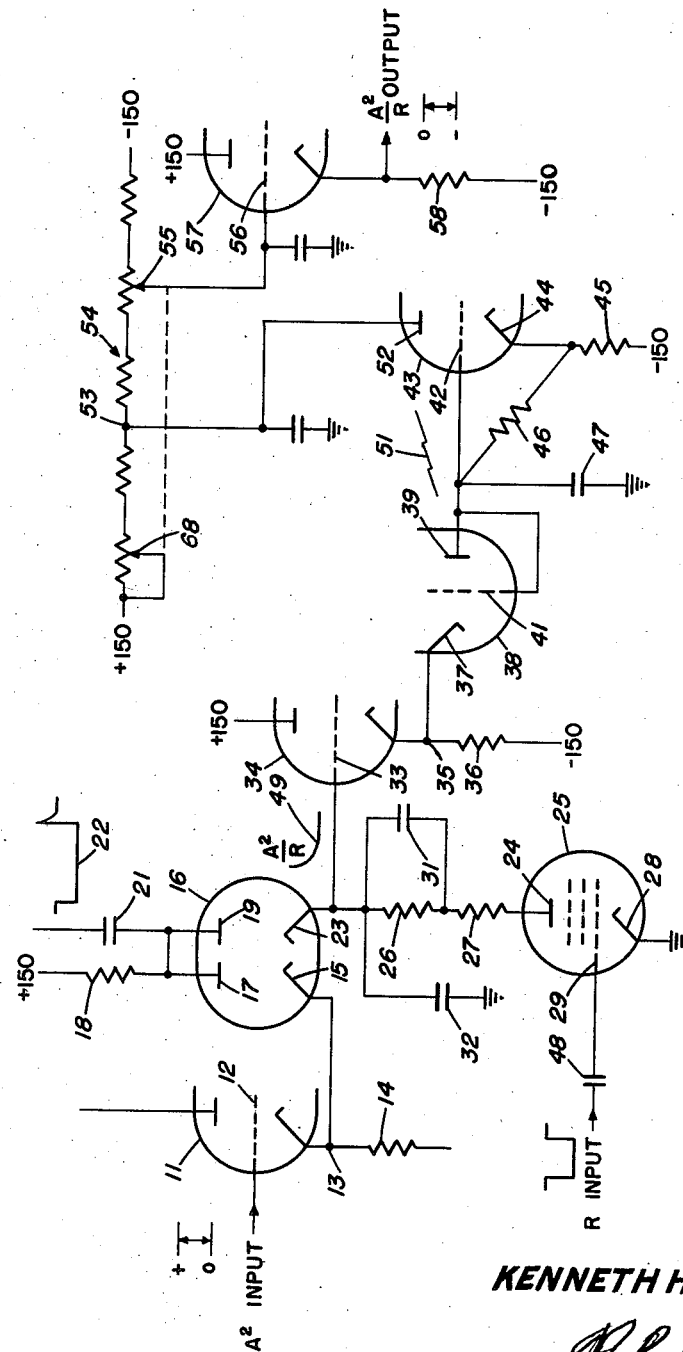
Inventor
KENNETH H. PERKINS

Patented May 25, 1954

2,679,587

UNITED STATES PATENT OFFICE 2,679,587

PROPORTIONAL VOLTAGE PRODUCING CIRCUIT

Kenneth H. Perkins, Lancaster, Ohio, assignor, by mesne assignments, to the United States of America as represented by the Secretary of the Navy Application January 4, 1951, Serial No. 204,324

7 Claims. (Cl. 250—27)

The present invention relates to a proportional voltage producing circuit and more particularly to a proportional voltage producing circuit for producing a voltage output proportional to at least two parameters.

Although the present invention is generally applicable to any system in which a proportional voltage is required, the following description relates to a specific application thereof, namely, an aircraft radiant energy detection system. In such systems, one of the voltages required to operate the same effectively is a voltage whose amplitude is proportional to the slant range of the aircraft to the target.

By definition, the slant range S may be written as $$S = (R^2 + A^2)^{1/2}$$

where R is the horizontal range of the aircraft to the target and A is the altitude of the aircraft.

Expanding this equation in accordance with the benominal theorem, the first few terms of the expansion are $$S = R + A^2/2R - A^4/8R^3 + A^6/16R^5$$

For the altitude and release ranges over which these systems are normally employed, the first two terms of the series are important, and the terms that follow may be neglected without any appreciable error. For release ranges of less than 2000 feet, the additional terms become increasingly important as range decreases.

Since both the terms R and $A^2$ are available in the detection systems, the present invention proposes a system for producing a voltage proportional to the ratio of the terms and supplying this voltage to the proper component of the system.

Accordingly, an object of the present invention is the provision of a proportional voltage producing circuit for producing a voltage output proportional to the ratio of the two parameters.

A further object is to provide a proportional voltage producing circuit having a low impedance output.

Another object is the provision of a proportional voltage producing circuit having a plurality of switching or clamping tubes for controlling the operation of a timing network in accordance with the selected parameters.

The exact nature of this invention as well as other objects and advantages thereof will readily be apparent from consideration of the following detailed description relating to the annexed drawing in which the single figure is a schematic diagram of a preferred embodiment of the present invention.

Referring now to the drawings, there is shown a tube 11 to grid 12 of which is connected a source of voltage proportional to $A^2$ derived from a potential divider, not shown, in the remainder of the system. Tube 11 is connected as a cathode follower in order to provide a low impedance source to the remainder of the circuit of the present invention.

Thus, the cathode end 13 of cathode resistor 14 is connected to cathode 15 of the left section of double diode tube 16. Plate 17 of the left section of tube 16 is connected to a plate supply through plate resistor 18.

Plate 19 of the right section of tube 16 is connected to the output of the time base generator of the system, not shown, through capacitor 21. Plates 17 and 19 are connected together so that the negative timing pulses 22 from the time base generator are applied thereto.

Cathode 23 of the left section of tube 16 is connected to plate 24 of tube 25 by means of resistors 26 and 27, cathode 28 of tube 25 being grounded. Control grid 29 of tube 25 is supplied with a negative range pulse from the horizontal range differential amplifier of the system, not shown, the duration of this range pulse being proportional to the horizontal range of the target.

A capacitor 31 is connected across resistor 26, while a storage capacitor 32 is connected between cathode 23 and ground. Resistors 26 and 27 and capacitor 31 constitute the RC time constant network, with storage capacitor 32 being connected in parallel with the series connection of this network and tube 25.

Cathode 23 of tube 16 is connected to the grid 33 of tube 34, which operates as a cathode follower. The cathode end 35 of cathode or load resistor 36 of tube 34 is connected to the cathode 37 of tube 38. Plate 39 and grid 41 of tube 38 are connected together so that tube 38 acts as a diode.

Plate 39 is connected to grid 42 of tube 43, cathode 44 of tube 43 being connected in series with cathode resistor 45. A resistor 46 is connected between grid 42 and cathode 44, while a storage capacitor 47 is connected between grid 42 and ground.

In operation, both sections of tube 16 are conducting during the interval between the transmission of pulse 22, the current flow being controlled by the voltage supplied to the left section of tube 16 through cathode follower tube 11.

This voltage is proportional to the one parameter $A^2$. Storage capacitor 32 is charged during this inter-pulse interval by the right section of tube 16.

When pulse 22, which is initiated by the trigger pulse of the system, is applied to plate 17 and 19, these plates are driven negative with respect to cathodes 15 and 23 and tube 16 is rendered non-conducting. Tube 16 remains cut off for the duration of pulse 22, this duration being 60 microseconds.

Upon cut-off of tube 16, capacitor 32 discharges through the time constant network and tube 25 which is initially conducting. The discharge characteristic of the timing network, that is resistors 26 and 27 and capacitor 31, is arranged so that it produces an exponentially decreasing voltage proportional at any time $t$ to $A^2/t$. Any desired values of the elements of the time constant network may be chosen to meet this requirement.

The negative range pulse applied to grid 29 of tube 25 through capacitor 48 is of sufficient amplitude to cut off tube 25. Since the leading edge of this pulse, with respect to time zero of pulse 22, represents the horizontal range from the aircraft to the target, the point during the active period of pulse 22 at which the range pulse is initiated and cuts off tube 25 is determined by the horizontal range R at any instant.

Capacitor 32 is therefore permitted to discharge through the time constant network only from the period of time from the initiation of pulse 22 to the initiation of the horizontal range pulse. Thus, the time $t$ during which discharge occurs is proportional to R, and the voltage on capacitor 32 at the instant tube 25 is cut off is proportional to $A^2/R$.

It is thus evident that tubes 16 and 25 act as switching or clamping tubes to control the operation of the time constant network and to produce an instantaneous voltage proportional to $A^2/R$. Tube 16 acts as the initial switching tube to cause discharge of capacitor 32 through the time constant network, while tube 25 determines the time at which the discharge ceases.

This voltage is transmitted through cathode follower tube 34 to tube 38 and capacitor 47. As this transient voltage, represented at 49, decreases and drives cathode 37 negative with respect to plate 39, tube 38 conducts, allowing capacitor 47 to discharge through tube 38 and resistor 36 to a voltage proportional to $A^2/R$. Capacitor 47 is initially charged to a voltage exceeding the $A^2/R$ voltage by tube 43.

Tube 38 continues to conduct until the end of the active period, that is, the end of pulse 22, thereby allowing capacitor 47 to reach the final $A^2/R$ voltage. The final voltage on capacitor 47 will therefore be proportional to $A^2/R$, except at the longer ranges when a negligible error will be introduced, since capacitor 47 will not completely discharge to the desired voltage before pulse 22 is removed.

During the inactive period, the circuit arrangement involving resistors 45 and 46 and tube 43 will slowly charge capacitor 47 by a small amount, this amount being determined by the current flow through tube 43 and the relative values of resistors 45 and 46. In practice, this amount is chosen to correspond to a slant range of 1.5 feet, so that during the next active period capacitor 47 will discharge only a slight amount to reach the applicable $A^2/R$ voltage.

Furthermore, the change in $A^2/R$ voltage from one active period to another is very small and, therefore only a slight change in the applicable $A^2/R$ voltage will be effected. This follows from the fact that the interval between the trigger pulses in the system which produce pulses 22 is only about 1000 microseconds, and the aircraft can travel only a very short distance in this time.

It is thus seen that the voltage produced on grid 42 is a slowly varying direct current voltage, as shown at 51, and that this voltage will be amplified by tube 43. Therefore, the output of tube 43 corresponds to the desired $A^2/R$ voltage.

In order to supply this voltage to the slant range differential amplifier of the system, not shown, plate 52 of tube 43 is connected to a fixed tap 53 of voltage divider 54, while an adjustable tap 55 of divider 54 is connected to the grid 56 of cathode follower tube 57. Thus, the voltage across cathode resistor 58 of tube 57 is proportional to $A^2/R$.

As shown in the drawing, a voltage is applied across divider 54, this voltage constituting an adjustable "zero set" voltage for the system. The adjustment is made by means of adjustable tap 68 coupled to tap 55 for shorting out a portion of the resistance of divider 54. Thus, the resultant voltage applied to grid 56 includes a voltage calibrated to set the slant range differential amplifier, not shown, at zero range.

It is thus seen that the present invention provides a circuit for supplying to the slant range differential amplifier a voltage proportional to $A^2/R$. This circuit has a low impedance input and output so that it does not effect adversely the circuits connected thereto.

It is to be understood, of course that the circuit of the present invention is of general applicability to any system in which it is desired to produce a voltage proportional to the ratio of two or more parameters. Furthermore various modifications in the disclosed structure are contemplated and may obviously be resorted to by those skilled in the art. It is therefore to be understood that, within the scope of the appended claims, the invention may be practiced otherwise than as specifically described.

What is claimed is:

1. A circuit for producing a voltage output proportional to the ratio of two parameters, said circuit comprising a storage capacitor, means coupled to said capacitor for charging said capacitor to a voltage proportional to one of the parameters, a time constant discharge network connected to said capacitor for discharging said capacitor to a voltage inversely proportional to the time duration of discharge, means coupled to said capacitor for initiating discharge of said capacitor through said network at a predetermined time, means coupled between said capacitor and said network for cutting off the discharge of said capacitor at a time interval after said predetermined time proportional to the other of the parameters, a second capacitor, means coupled to said second capacitor for initially charging said second capacitor to a voltage exceeding the desired output, means coupled between the storage capacitor and said second capacitor responsive to the potential across said storage capacitor for discharging said second capacitor whenever the voltage on said second capacitor exceeds said potential, and an output circuit coupled to said second capacitor.

2. A circuit for producing a desired voltage output proportional to the ratio of at least two parameters, said circuit comprising a storage capacitor, means coupled to said capacitor for charging said capacitor to a voltage proportional to one of the parameters, a discharge network for discharging said capacitor to a voltage inversely proportional to the time duration of discharge, means coupled between said capacitor and said network for discharging said capacitor for a time interval proportional to another of the parameters, a second capacitor, means for initially charging said second capacitor to a voltage exceeding the desired voltage output, means coupled between said capacitors for discharging said second capacitor whenever the voltage on said second capacitor exceeds the voltage across said storage capacitor, and an output circuit coupled to said second capacitor.

3. In a circuit for producing a desired voltage output proportional to the ratio of at least two parameters, the combination comprising a first capacitor, means coupled to said capacitor for charging said capacitor to a voltage proportional to one of the parameters, a discharge network for discharging said capacitor to a voltage inversely proportional to the time duration of discharge, means coupled between said capacitor and said network for discharging said capacitor for a time interval proportional to another of the parameters, a second capacitor, means for initially charging said second capacitor to a voltage exceeding the desired voltage output, and means coupled between said capacitors responsive to the difference in potential between said capacitors for discharging said second capacitor whenever the potential on said second capacitor exceeds the potential on said first capacitor.

4. In a circuit for producing a voltage output proportional to the ratio of at least two parameters, the combination comprising a storage capacitor, means coupled to said capacitor for charging said capacitor to a voltage proportional to one of the parameters, a discharge network for discharging said capacitor to a voltage inversely proportional to the time duration of discharge, means coupled to said capacitor for initiating discharge of said capacitor through said network at a predetermined time, and means coupled between said capacitor and said network for cutting off the discharge of said capacitor at a time interval after said predetermined time proportional to another of the parameters.

5. In a circuit for producing a voltage output proportional to the ratio of at least two parameters, the combination comprising a storage capacitor, means coupled to said capacitor for charging said capacitor to a voltage proportional to one of the parameters, a time constant discharge network for discharging said capacitor to a voltage inversely proportional to the time duration of discharge, means coupled to said capacitor for initiating the discharge thereof at a predetermined time, and means coupled between said capacitor and said network for discharging said capacitor for a time interval beginning at said predetermined time proportional to another of the parameters.

6. A circuit for producing a voltage output proportional to the ratio of two parameters, said circuit comprising a storage capacitor, an electron discharge tube coupled to said capacitor, means coupled to said tube for supplying thereto a voltage proportional to one of the parameters, said tube being initially conducting to charge said capacitor to the value of said voltage, a time constant discharge network coupled to said capacitor, means coupled to said tube to render said tube non-conducting to thereby initiate discharge of said capacitor through said time constant discharge network at a predetermined time, said capacitor being discharged to a voltage inversely proportional to the time duration of said discharge, means coupled to said discharge network for terminating the discharge of said capacitor at a time interval after said predetermined time proportional to the other of said parameters, a second capacitor initially charged to a voltage exceeding the desired output, means responsive to the potential across said storage capacitor for discharging said second capacitor whenever the voltage on said second capacitor exceeds said potential, and an output circuit coupled to said second capacitor.

7. A circuit for producing a voltage output proportional to the ratio of two parameters, said circuit comprising a storage capacitor, an electron discharge tube coupled to said capacitor, means coupled to said tube for supplying thereto a voltage proportional to one of the parameters, said tube being initially conducting to charge said capacitor to the value of said voltage, a time constant discharge network coupled to said capacitor, means coupled to said tube to render said tube non-conducting to thereby initiate discharge of said capacitor through said time constant discharge network at a predetermined time, said capacitor being discharged to a voltage inversely proportional to the time duration of said discharge, and means coupled to said discharge network for terminating the discharge of said capacitor at a time interval after said predetermined time proportional to the other of said parameters.

References Cited in the file of this patent

UNITED STATES PATENTS

| Number | Name | Date |
| --- | --- | --- |
| 2,415,567 | Schoenfeld | Feb. 11, 1947 |
| 2,455,283 | Valley, Jr. | Nov. 30, 1948 |
| 2,455,373 | Lester | Dec. 7, 1948 |
| 2,466,705 | Hoeppner | Apr. 12, 1949 |
| 2,474,040 | Day | June 21, 1949 |